United States Patent Office 3,338,377
Patented Aug. 29, 1967

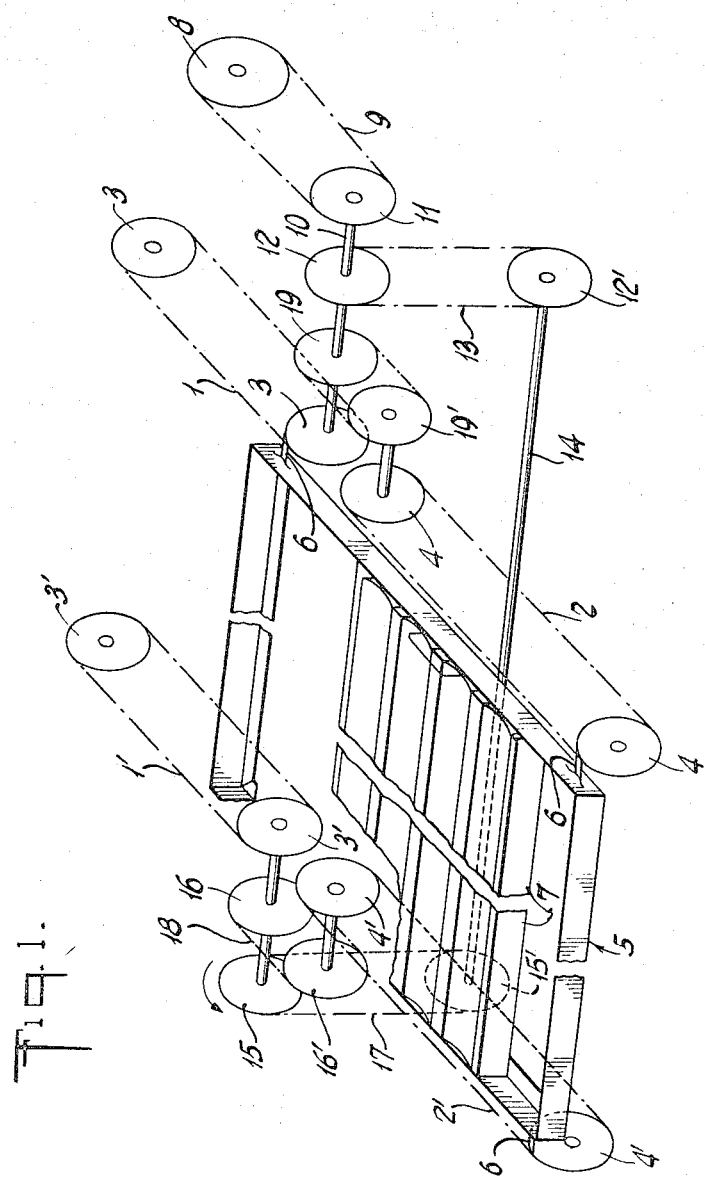

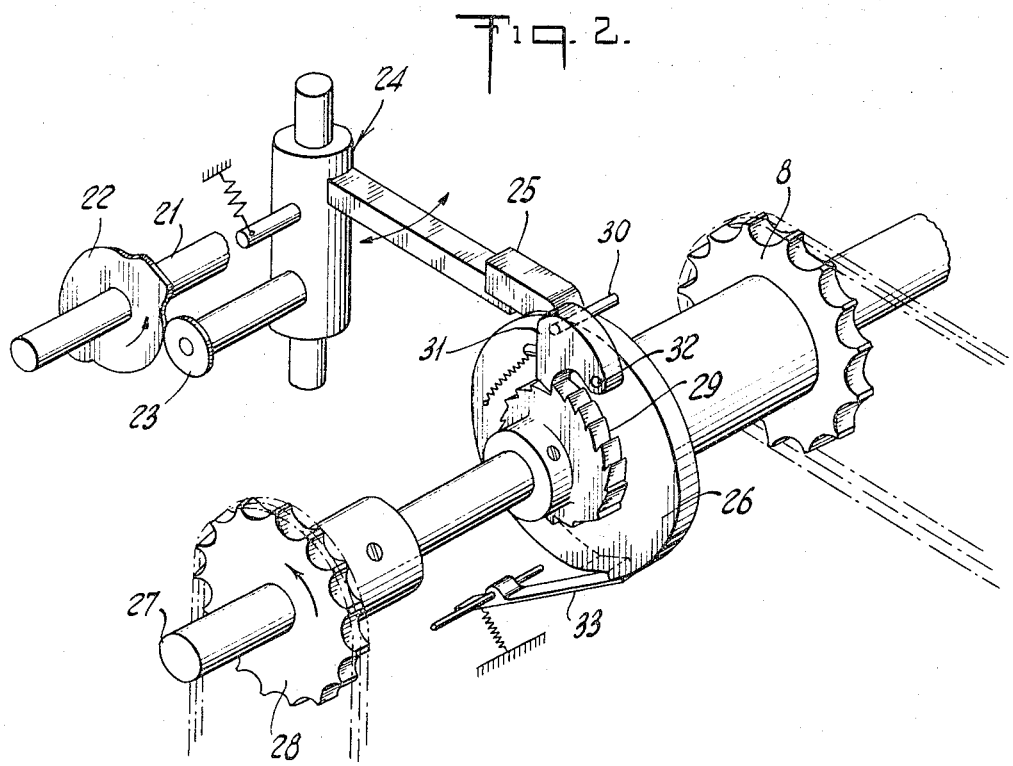

3,338,377
APPARATUS FOR AUTOMATICALLY MOVING TRAYS FOR DOUGH PIECES FROM A LOADING TO AN UNLOADING POSITION
Helmut Richter, Halle, Saale, Peter Wohlfahrt, Leipzig, and Peter Fuchs and Arno Arndt, Halle, Saale, Germany, assignors to VEB Vereinigte Backereimaschinenwerke, Halle, Saale, Germany
Filed Aug. 9, 1965, Ser. No. 478,165
1 Claim. (Cl. 198—135)

This invention relates to an apparatus for automatically moving fixed trays for dough pieces, such as fermenting trays, tilting frames, trays and the like mounted on conveyor type chains.

An apparatus is known for moving trays having two guiding tracks associated with rollers and arranged beneath a removing station. The disadvantage of this device is that the device must be manually operated and that a large space is needed for removing the trays.

Another device is known, in which two superimposed conveyors are mounted beneath a receiving device for baking trays, which are movable in opposite directions, in such a manner that the loaded trays can be taken off the receiving device from the upper level conveyor, and the other trays can be placed on the lower level conveyor. The first empty tray is conveyed to a bifurcated elevated mechanism and is delivered to the upper level conveyor for loading. Thereafter, this tray is moved to an unloading station by the pivotal movement of the elevating mechanism.

The disadvantage of the above described apparatus is basically the time needed for actuating the elevated mechanism and the space required for mounting the trays on the conveyor, whereby the complicated transfer mechanism delays the continuity of moving the trays.

It is an object of the present invention to provide an apparatus which eliminates the shortcomings of the prior art as outlined above by providing a simple but efficient transporting device.

It is a further object of the invention to provide an apparatus for automatically moving fixed trays in such a manner that the tray exchange can be performed in a space saving manner.

In the present invention, means are provided for moving a transport frame guided by endless chains arranged in a series for receiving trays without jamming the trays. For space saving purposes, the trays are mounted laterally with respect to a removing station. Each of the chains receives an intermittent motion by means of associated chains and from an actuating pulley engageable with and actuated by an indexing mechanism. The advantage of this arrangement is an automatic movement of trays from one direction to an opposite direction at the same rate of speed, and without the use of complicated actuating devices to bring about the opposite movement of the device.

The various features of novelty which characterize the invention are pointed out with particularity in the claim annexed to and forming a part of the specification. For a better understanding of the invention, its operating advantages and the specific objects obtained by the use thereof, reference should be had to the accompanying drawings in which:

FIG. 1 is a plan view of the apparatus.
FIG. 2 is a view of the mechanical indexing mechanism.

According to FIG. 1, the apparatus consists of four conveyor chains, 1, and 1' and 2 and 2'. The two right hand chains 1 and 2 and the two left hand chains 1' and 2' are arranged in series, and the chains 1 and 1', and 2 and 2' are disposed parallel to each other. The chains are guided by pulleys 3 and 3' and 4 and 4' respectively, each having an equal number of links and pulley teeth.

Transport frame 5 is mounted free of jamming by four brackets 6 on each of the chains 1 and 1' and 2 and 2', and receives trays 7 which are secured to the frame by adjustable brackets (not shown). An actuating sprocket 8 is connected with an indexing mechanism which is described in detail with respect to FIG. 2. An actuating chain 9 communicates with this indexing mechanism and with a sprocket 11 mounted on shaft 10 in a defined transmission ratio.

In order to obtain the required synchronous movement of chains 1 and 1', 2 and 2' additional chains 13, 17, and 18 are provided. Sprockets 12 and 12' are connected by means of chain 13 about a shaft 14 with further sprockets 15, 15', 16 and 16', which are also connected to guide pulleys 3' and 4' of chains 1' and 2' by means of chains 17 and 18. Another connection is provided by a chain which passes around and engages sprockets 19 and 19' to guide pulleys 3 and 4 of chains 1 and 2 respectively.

According to FIG. 2, the mechanical switching mechanism comprises a constant speed shaft 21 having a cam disc 22 provided with two curves and engaging a roller 23 of a pivotally mounted control mechanism 24. A wedge shaped portion 25 of control mechanism 24 is adapted to engage the circumferential periphery of a drive disc 26. Drive sprocket 8 and drive disc 26 are connected by means of a hub and are pivotally mounted on a drive shaft 27 on which sprocket 28 and an arresting wheel 29 are secured. A pawl 31 having a pivot point 32 and a guide pin 30 are pivotally mounted on drive disc 26. A reverse arresting means 33 is arranged tangentially with respect to the circumferential periphery of cam disc 26.

The inventive feature of this apparatus is arranged transversely to an unloading station (not shown) so as to enable the loading of the tray arrangement 7 throughout its whole length in one working operation. The index mechanism transforms the rotating movement of the conveyor into a reciprocating motion which is transmitted through chains 9, 13, 17, 18 and 20, to the right hand chains 1 and 2 and to the left hand chains 1' and 2', whereby the transport frame 5 with its associated tray arrangement 7 moves automatically beneath and transversely of an unloading station (not shown), and is rendered inoperative by the indexing mechanism for unloading purposes.

The maximum horizontal movement of the transport frame 5 in either direction is defined by the distance between the axis of guide pulleys 3 plus the diametrical pitch of the guide pulleys, whereas the amount of rotation of guide pulleys 3 with associated chain 1 depends entirely on the desired transportation lengths and the desired index time. After unloading tray arrangement 7, the tray arrangement is automatically moved back to a loading position and again stopped by the indexing mechanism, for the purpose of replacing the trays. The direction of chain movement 9, 13, 17, 18, and 20 does not change during this operation.

According to FIG. 2, the intermittent motion of drive sprocket 8 is obtained by means of the indexing mechanism. The indexing mechanism is shown shortly before drive sprocket 8 is being switched off. At this point roller 23 of control mechanism 24 is disengaged from one of the two curves of cam disc 22, whereby the wedge shaped portion 25 is pivoted onto the circumferential periphery of drive disc 26. The rotational connection between drive disc 26 and drive shaft 27 is interrupted in that wedge shaped portion 25 forces guide pin 30 and thereby pawl 31 out of contact with arresting wheel 29. Simultaneously, drive sprocket 8 is rendered inoperative, and arresting means 33 arrests drive disc 26. Drive shaft 27 together with the fixedly mounted sprockets 28, and ratchet 29 maintain a constant rotational movement. The actuation of the device is achieved when one of the curves of cam disc 22 deflects roller 23 of control mechanism 24 and wedge shaped portion 25 is thereby pivoted laterally out of the range of drive disc 26. Thereby, pawl 31 engages arresting wheel 29 and reestablishes the rotating connection to drive sprocket 8.

Thus, the apparatus of the present invention is capable of cyclically moving trays repeatedly and automatically from a loading station to an unloading station and then back to the loading station. The plurality of endless drive chains 1, 1′, 2, 2′ are situated along a path which extends between the loading and unloading stations, and the transport frame 5 is mounted by way of the connecting means 6 on these chains. The connecting means 6 has the pins thereof, which are fixed to the frame 5, simply extending into openings of the chain links so that the chain links of the several chains 1, 1′, 2, 2′ are freely turnable with respect to the pins 6, and thus the frame 5 will remain horizontal as it moves in one direction while the pins 6 are situated at the upper runs of the chains, and the frame 5 will remain horizontal as it moves to the lower elevation to be returned while the pins 6 are connected to the lower runs of the chains. In this way because of the chain links can turn with respect to the pins 6, the frame 5 will always remain horizontal as it moves back and forth, as well as up and down while the pins 6 move around the sprockets. The trays 7 are of course carried by the frame 5 and are adapted to be loaded at the loading station and unloaded at the unloading station. The drive sprocket means shown in detail in FIG. 2 is operatively coupled to the chains for driving them, and the indexing means, which is also shown in FIG. 2, is coupled to the drive sprocket means for imparting thereto an intermittent motion providing for the transport frame 5 movement between the loading and unloading stations while maintaining the frame 5 stationary at the loading and unloading stations for predetermined intervals.

This invention, should not however be limited to the specific embodiments shown by the appended drawings, but rather defined by the scope of the appended claim.

What is claimed is:

An apparatus for cyclically moving trays repeatedly and automatically from a loading station to an unloading station and then back to said loading station comprising: a plurality of endless drive chains situated along a path extending between said stations, a transport frame, connecting means for connecting said frame to said drive chains to be moved thereby between said stations and for maintaining said frame horizontal while said frame is moved by said chains, said transport frame being adapted to carry a plurality of trays, drive sprocket means coupled to said chains for driving the latter, an indexing means coupled to said drive sprocket means for imparting thereto an intermittent motion which advances said transport frame between said stations while maintaining said frame stationary at said stations for predetermined intervals.

References Cited
UNITED STATES PATENTS

| | | | |
|---|---|---|---|
| 2,736,419 | 2/1956 | Ferro | 198—135 |
| 2,847,113 | 8/1958 | Dumas | 198—135 |
| 2,859,713 | 11/1958 | Noel | 198—131 |

EVON C. BLUNK, *Primary Examiner.*

RICHARD E. AEGERTER, *Examiner.*